United States Patent [19]

Kamimura et al.

[11] Patent Number: 4,973,855

[45] Date of Patent: Nov. 27, 1990

[54] VEHICLE SUSPENSION SYSTEM

[75] Inventors: Shoichi Kamimura; Takeshi Edahiro; Shin Takehara; Toshiki Morita, all of Hiroshima, Japan

[73] Assignee: Mazda Motor Corporation, Hiroshima, Japan

[21] Appl. No.: 451,967

[22] Filed: Dec. 19, 1989

[30] Foreign Application Priority Data

Dec. 20, 1988 [JP] Japan .................................. 63-322847

[51] Int. Cl.$^5$ .............................................. B60G 11/26
[52] U.S. Cl. .................................................... 280/707
[58] Field of Search ......................................... 280/707

[56] References Cited

U.S. PATENT DOCUMENTS

| | | | |
|---|---|---|---|
| 4,765,648 | 8/1988 | Mander et al. | 280/707 |
| 4,803,627 | 2/1989 | Yasuike et al. | 280/707 |
| 4,826,205 | 5/1989 | Kouda et al. | 280/707 |
| 4,827,416 | 5/1989 | Kawagoe et al. | 280/707 |

FOREIGN PATENT DOCUMENTS 59-14365  4/1984  Japan .

61-215105 9/1986 Japan .

*Primary Examiner*—Kenneth R. Rice
*Attorney, Agent, or Firm*—Sixbey, Friedman, Leedom & Ferguson

[57] ABSTRACT

A vehicle suspension system has fluid cylinders connected between the vehicle body and the respective wheels. A fluid control system controls feed and discharge of hydraulic fluid to and from the fluid cylinders and changes the suspension properties of the suspension system. A failure in the fluid control system is detected and when the control system fails, one of first to third measure modes is taken on the basis of the kind of the failure. Warning is just given and the control of feed and discharge of hydraulic fluid to and from the fluid cylinders being continued when the first measure mode is taken, the control of feed and discharge of hydraulic fluid to and from the fluid cylinders is interrupted with the chassis height fixed to the present height when the second measure mode is taken, and the fluid in the fluid cylinders is discharged and the chassis height is lowered when the third measure mode is taken.

8 Claims, 4 Drawing Sheets

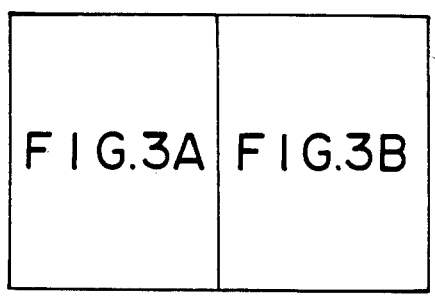
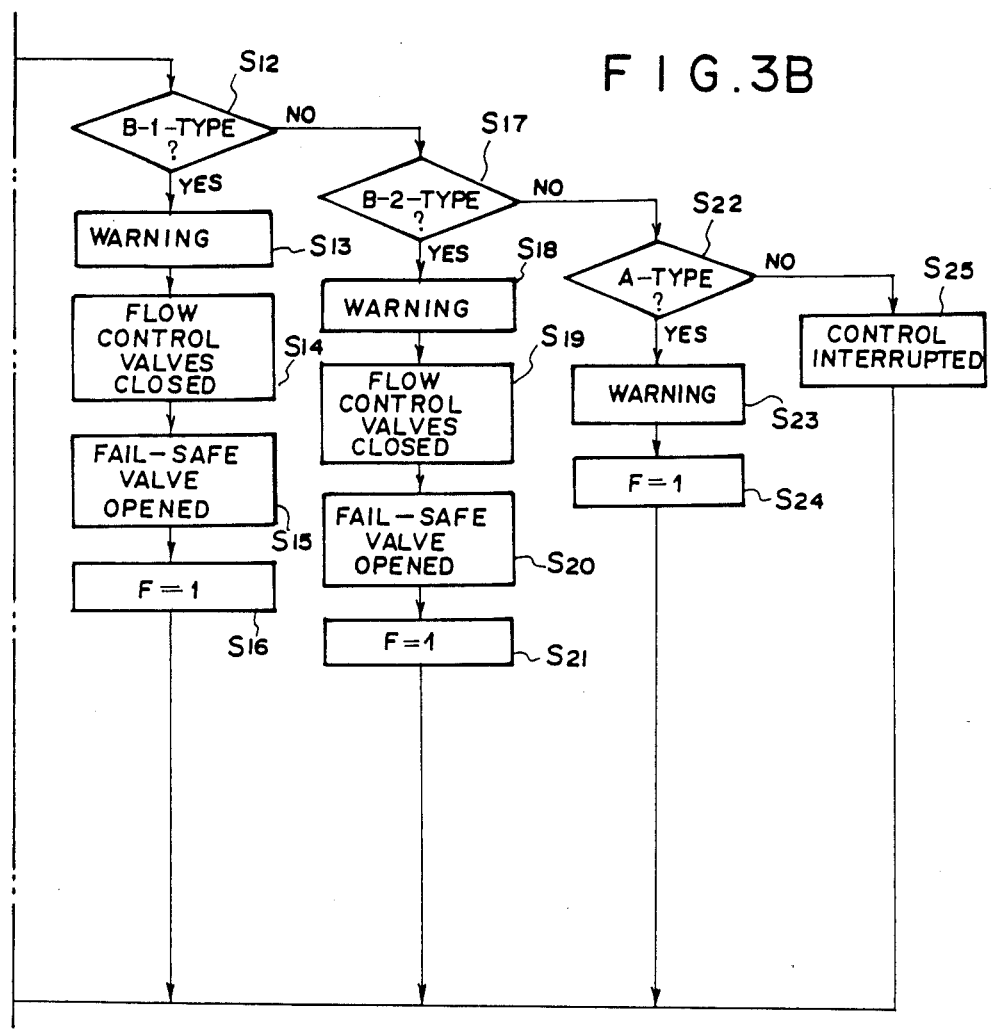

VEHICLE SUSPENSION SYSTEM

BACKGROUND OF THE INVENTION

1. Field of the Invention

This invention relates to a vehicle suspension system, and more particularly to a vehicle suspension system which includes a fluid cylinder and in which the suspension properties change with change in the amount of fluid introduced into the fluid cylinder.

2. Description of the Prior Art

As disclosed, for instance, in Japanese Patent Publication No. 59-14365, there has been known a socalled hyrdro-pneumatic suspension system which comprises fluid cylinders connected between the vehicle body and the respective wheels and a gas spring connected to each of the fluid cylinders.

Further, there has been known an active control suspension system in which the amount of fluid introduced into the fluid cylinder for each wheel is changed separately from the other fluid cylinders and the properties of which is changed according to the operating condition of the vehicle.

When such an active control suspension system is actually incorporated in a vehicle, fail-safe measures against a failure in the flow control system for controlling the amount of fluid introduced into the fluid cylinders or in various sensors should be taken.

As the fail-safe measures, immediate interruption of the control, warning and the like can be employed. However, it is preferred that suitable measure be selected according to the kind of the failure. That is, when the control is immediately interrupted for a failure which does not affect the nature of the control, the effect of the active suspension system, e.g., improvement in the driving performance, will be easily lost. On the other hand, just a warning is not sufficient in view of safety for a failure which affects the nature of the control occurs.

SUMMARY OF THE INVENTION

In view of the foregoing observations and description, the primary object of the present invention is to provide a suspension system in which, in case the control system for controlling feed and discharge of hydraulic fluid to and from the fluid cylinders fails, suitable measure is taken according to the kind of the failure, thereby obtaining an excellent driving performance as long as possible without adversely affecting safety.

In accordance with one aspect of the present invention, there is provided a vehicle suspension system comprising fluid cylinders connected between the vehicle body and the respective wheels; a fluid control system which controls feed and discharge of hydraulic fluid to and from the fluid cylinders and changes the suspension properties of the suspension system; a failure detecting means which detects a failure in the fluid control system; a measure mode determining means which receives a signal from the failure detecting means and determines which of first to third measure modes is to be taken on the basis of the kind of the failure represented by the signal, warning being just given and the control of feed and discharge of hydraulic fluid to and from the fluid cylinders being continued when the first measure mode is taken, the control of feed and discharge of hydraulic fluid to and from the fluid cylinders being interrupted with the chassis height fixed to the present height when the second measure mode is taken, and the fluid in the fluid cylinders being discharged and the chassis height being lowered when the third measure mode is taken; and a measure mode performing means which receives a signal from the measure mode determining means and performs the measure mode determined by the measure mode determining means.

In accordance with another aspect of the present invention, there is provided a vehicle suspension system comprising fluid cylinders connected between the vehicle body and the respective wheels; a fluid control system which controls feed and discharge of hydraulic fluid to and from the fluid cylinders and changes the suspension properties of the suspension system; a failure detecting means which detects a failure in the fluid control system; a measure mode determining means which receives a signal from the failure detecting means and determines which of first to third measure modes is to be taken on the basis of the kind of the failure represented by the signal, warning being just given and the control of feed and discharge of hydraulic fluid to and from the fluid cylinders being continued when the first measure mode is taken, the control of feed and discharge of hydraulic fluid to and from the fluid cylinders being interrupted with the chassis height fixed to the present height when the second measure mode is taken, and the fluid in the fluid cylinders being discharged and the chassis height being lowered when the third measure mode is taken; a measure mode duration determining means which determines whether the determination of the measure mode determining means is to be canceled when the ignition switch of the vehicle is turned off or to be held until the failure is removed; and a measure mode performing means which receives a signal from the measure mode determining means and the measure mode duration determining means and performs the measure mode determined by the measure mode determining means.

When the failure detected by the failure detecting means is one which can sometimes be removed without service, the measure mode duration determining means determines, that the determination of the measure mode determining means is to be canceled when the ignition switch of the vehicle is turned off. On the other hand when the failure detected by the failure detecting means is one which can be never removed without service, the measure mode duration determining means determines, that the determination of the measure mode determining means is to be held until the failure is removed. The failures which require the first measure mode belong the former and the failures which require the third measure mode belong the latter. The failures which require the second measure mode include both the former and the latter.

Generally, when a failure which does not affect the nature of the control occurs (e.g., when only a small amount of oil remains in the oil reservoir), the first measure mode is taken. When a failure which affects the nature of the control occurs (e.g., when a sensor such as a chassis height sensor fails), the second measure mode is taken. Further, when the failure is such as to cause the chassis heights at the respective wheels to differ from each other, the third measure mode is taken and the chassis is leveled.

DESCRIPTION OF THE PREFERRED EMBODIMENT

Figure 1:
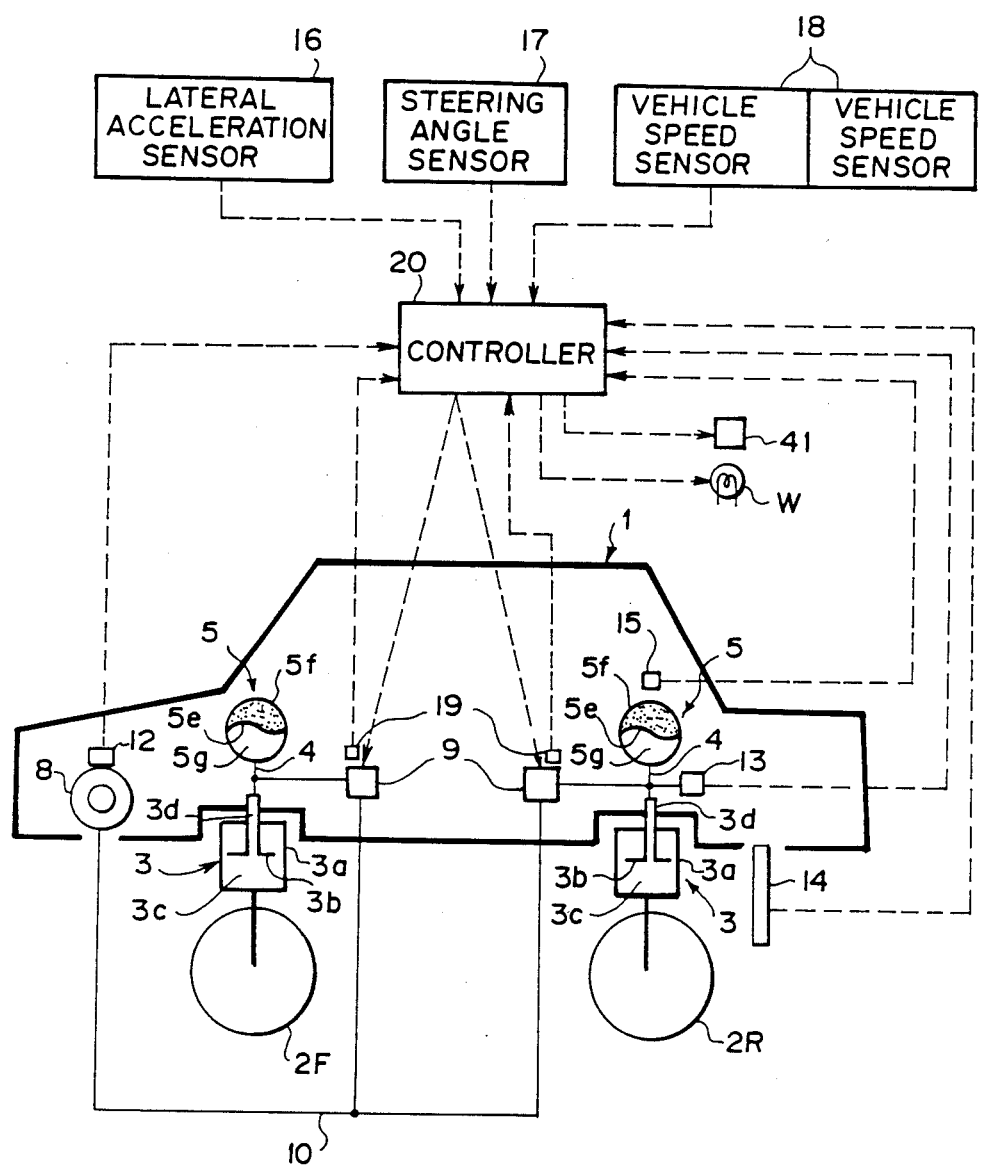
FIG. 1 is a schematic view showing a vehicle provided with a suspension system in accordance with an embodiment of the present invention.

In FIG. 1, reference numerals 1, 2F and 2R respectively denote a vehicle body, a front wheel and a rear wheel. A fluid cylinder 3 is connected between each wheel and the vehicle body 1. The fluid cylinder 3 comprises a cylinder body 3a and a piston 3b which is received in the cylinder body 3a and forms a liquid pressure chamber 3c in the cylinder body 3a. The piston 3b is connected to a piston rod 3d the upper end of which is connected to the vehicle body 1. The cylinder body 3a is connected to the wheel at the lower end thereof.

A gas spring 5 is connected to the liquid pressure chamber 3c of each fluid cylinder 3 by way of a communicating passage 4. The inner space of each gas spring 5 is divided into a gas chamber 5f and a liquid pressure chamber 5g by a diaphragm 5e, and the liquid pressure chamber 5g is communicated with the liquid pressure chamber 3c of the fluid cylinder 3.

Each fluid cylinder 3 is connected to a hydraulic pump 8 by way of a liquid pressure passage (high pressure line) 10. A flow control valve 9 which is provided in the liquid pressure passage 10 for each fluid cylinder 3 controls feed and discharge of hydraulic fluid to and from the fluid cylinder 3.

A main pressure sensor 12 detects the discharge pressure of the hydraulic pump 8 (more strictly, the pressure of accumulated oil at accumulators 22a and 22b which will be described later), cylinder pressure sensors 13 detect the liquid pressure in the liquid pressure chambers 3c of the respective fluid cylinders 3c, chassis height sensors 14 detect the chassis heights at the respective wheels (cylinder stroke), vertical acceleration sensors 15 detect the vertical accelerations of the vehicle at the respective wheels, a lateral acceleration sensor 16 detects the lateral acceleration of the vehicle, a steering angle sensor 17 detects the turning angle of the front wheels 2F (as the dirigible wheels), a pair of vehicle speed sensors 18 detect the vehicle speed, and valve position sensors 19 detect the stroke position of the respective flow control valves 9. The detecting signals of these sensors 12 to 11 are input into a controller 20 which may be of a CPU, for instance, and the controller 20 changes the suspension properties on the basis of the detecting signals. In FIG. 1, the cylinder pressure sensors 13, the chassis height sensors 14 and the vertical acceleration sensors 15 for the front wheels 2F are not shown.

Figure 2:
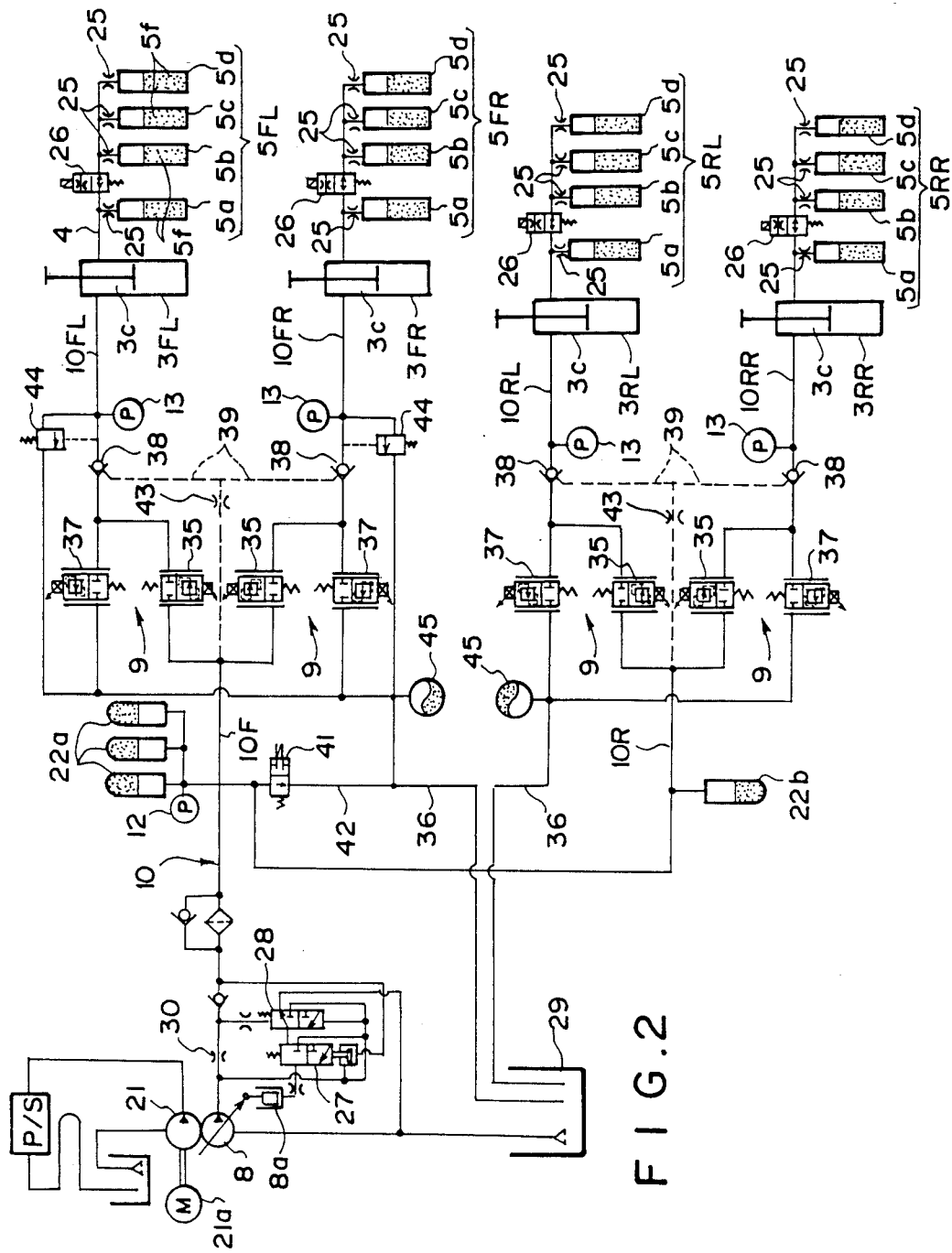
FIG. 2 is a view showing the hydraulic control circuit of the suspension system.

The hydraulic pressure circuit which controls feed and discharge of the hydraulic fluid to and from the fluid cylinders 3 is shown in FIG. 2. In FIG. 2, the hydraulic pump is a variable volume type swash plate piston pump and is connected to a hydraulic pump 21 for a power steering system, so that they form a two-throw pump. The hydraulic pump 21 is driven by a motor 21a. The liquid pressure passage 10 connected to the hydraulic pump 8 is provided with three accumulators 22a which are connected thereto through the same connection. The liquid pressure passage 10 branches into a front wheel side passage 10F and a rear wheel side passage 10R at the connection of the accumulators 22a. Further, the front wheel side passage 10F branches into left and right front wheel side passages 10FL and 10FR which are respectively communicated with the liquid pressure chambers 3c of the fluid cylinders 3FL and 3FR for the left and right front wheels. The rear wheel side passage 10R is provided with an accumulator 22b and branches into left and right rear wheel side passages 10RL and 10RR at a portion downstream of the accumulator 22b. The left and right rear wheel side passages 10RL and 10RR are respectively communicated with the liquid pressure chambers 3c of the fluid cylinders L and 3RR for the left and right rear wheels.

Gas spring groups 5FL, 5FR, 5RL and 5RR each consisting of four gas springs 5a to 5d are respectively communicated with the liquid pressure chambers 3c of the corresponding fluid cylinders 3 by way of communicating passages 4. Each of the gas springs 5a to 5d are connected to the communicating passage 4 by way of an orifice 25. The orifices 25 exhibit attenuating effect and the gas in the gas chambers 5f of the gas springs 5a to 5d exhibit damping effect. An attenuation changing valve 26 for changing the effective cross-section area of the communicating passage 4 is provided in the communicating passage 4 between the first and second gas springs 5a and 5b. The attenuation changing valve 26 moves between an open position where it wide opens the communicating passage 4 and a closed position where it substantially narrows the effective cross-sectional area of the communicating passage 4.

An unload valve 27 and a flow control valve 28 are connected to the liquid pressure passage 10 upstream of the accumulators 22a. The unload valve 27 moves between an introducing position where it introduces the hydraulic oil discharged from the hydraulic pump 8 into a swash plate actuating cylinder 8a so that the oil discharge rate of the hydraulic pump 8 is reduced and a discharge position where it discharges the hydraulic oil in the cylinder 8a. The unload valve 27 moves from the discharge position to the introducing position when the discharge pressure of the hydraulic pump 8 exceeds a predetermined upper limit ($160 \pm 10 kgf/cm^2$), and stays in the introducing position until the discharge pressure of the hydraulic pump 8 falls below a predetermined lower limit ($120 \pm 10 kgf/cm^2$), thereby holding the discharge pressure of the hydraulic pump 8 within a predetermined range, i.e., 120 to $160 kgf/cm^2$. The flow control valve 28 moves between an introducing position where it introduces the hydraulic oil discharged from the hydraulic pump 8 into a swash plate actuating cylinder 8a through the unload valve 27 and a discharge position where it discharges the hydraulic oil in the cylinder 8a to an oil reservoir 29 through the unload valve 27, thereby holding constant the pressure difference between the pressure in the liquid pressure passage 10 upstream of a constriction 30 and that downstream of the constriction 30 and holding constant the discharge rate of the hydraulic pump 8 while the discharge pressure of the hydraulic pump 8 is held in the predetermined range by the unload valve 27. To each of the fluid cylinders 3 is fed the hydraulic oil accumulated in the accumulators 22a and 22b. The pressure of the hydraulic oil accumulated in the accumulators 22a and 22b is referred to as the main pressure.

Four flow control valve assemblies 9, each for one of the wheels, are provided in the liquid pressure passage lo downstream of the accumulators 22a. Since the four flow control valve assemblies 9 are the same in structure, only the flow control valve assembly 9 for the left front wheel 2FL will be described here. The flow control valve assembly 9 comprises a feed side flow control valve 35 provided in the left front wheel side passage 10FL and a discharge side flow control valve 37 provided in a low pressure line 36 through which the hydraulic oil in the left front wheel side passage 10FL is discharged to the reservoir 29. Each of the flow control valves 35 and 37 moves between an open position and a closed position and is provided with a built-in differential valve which holds the hydraulic pressure constant at a predetermined value when the flow control valve is in the open position. When each of the flow control valves 35 and 37 is in the open position, the degree of opening can be changed by a control signal. A check valve 38 which operates in response to a pilot pressure is provided in the left front wheel side passage 10FL between the feed side flow control valve 35 and the fluid cylinder 3FL. To the check valve 38 is applied the hydraulic pressure in the liquid pressure passage 10 upstream of the feed side flow control valve 35 (i.e., the main pressure) as the pilot pressure through a pilot line 39. The check valve 38 is closed when the pilot pressure is not higher than 40kgf/cm². That is, feed of the hydraulic oil to the fluid cylinder 3 and discharge of the hydraulic oil from the same are both possible only when the main pressure is higher than 40kgf/cm².

A fail-safe valve 41 is provided in a communicating passage 42 which communicates the low pressure line 36 and a portion of the liquid pressure passage 10 downstream of the accumulators 22a. When a failure occurs, the fail-safe valve 41 opens to return the hydraulic oil in the accumulators 22a and 22b and lower the pressure in the hydraulic pressure circuit. A constriction 43 is provided in the pilot line 39 and delays closure of the check valve 38 (e.g., for one second) when the fail-safe valve 41 opens. Reference numeral 44 denotes a relief valve which opens and returns the hydraulic oil in the fluid cylinders to the low pressure line 36 when the hydraulic pressure in the fluid cylinders 3FL and 3FR for the front wheels becomes abnormally high. A return accumulator 45 is provided in the low pressure line 36 and accumulate pressure when the hydraulic oil is discharged from the fluid cylinders 3.

The controller 20 includes a chassis height control system which causes the chassis height to a desired height on the basis of the detecting signals of the chassis height sensors 14, a vertical vibration control system which reduces the vertical vibration of the vehicle body on the basis of detecting signals of the vertical acceleration sensors 15a, a load control system which equalizes the loads supported on the left and rear wheels for each of the front wheels and rear wheels on the basis of the detecting signals of the cylinder pressure sensors 13, and a fluid cylinder control system which improves the response of the fluid cylinders 3 during cornering on the basis of the detecting signals of lateral acceleration sensor 16, the steering angle sensor 17 and the vehicle speed sensor 18.

Figure 3A:
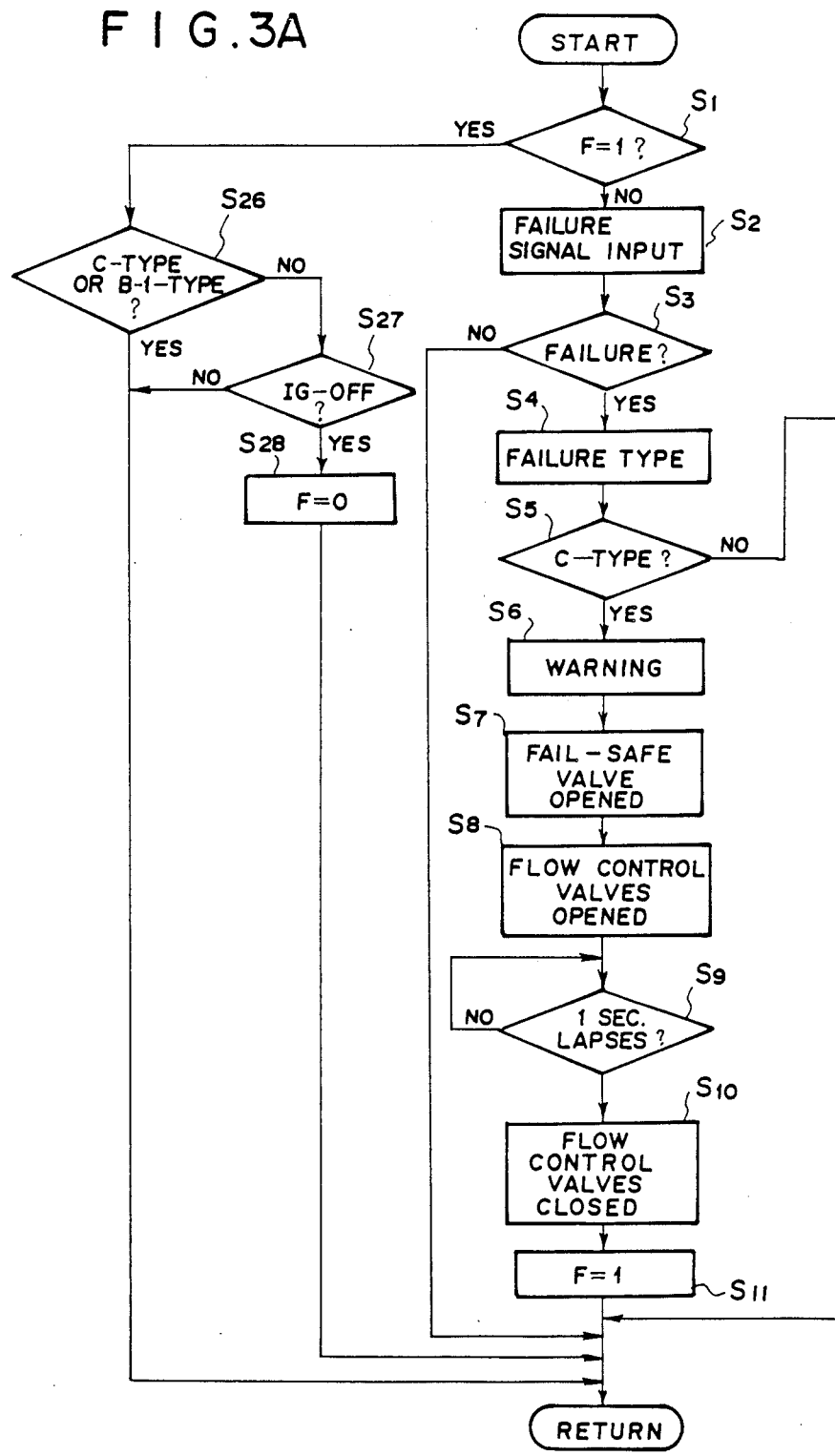
FIG. 3 is a flow chart for illustrating the operation of the controller.

When one or more of the components of these control systems fail, the controller 20 performs a fail-safe function in the manner shown in FIG. 3.

The controller 20 first determines whether flag F (the function of which will become apparent later) is "1". (step S1) When it is determined in step S1 that the flag F is not "1", the detecting signals of the sensors 12 to 19 are input in step S2 and the controller 20 determines in step S3 whether a failure has occurred on the basis of the detecting signals. When it is determined in step S3 that no failure has occurred, the controller 20 immediately returns. Otherwise the controller 20 proceeds to step S4, and determines the kind of the failure and determines the measure mode to be taken according to the kind of the failure. In accordance with the present invention, the failures in the control systems are divided into three types, A-type, B-type and C-type, and first to third measure modes are respectively taken for the A-type, B-type and C-type failures. When the first measure mode is taken, warning is just given and the control of feed and discharge of hydraulic fluid to and from the fluid cylinders is continued. When the second measure mode is taken, the control of feed and discharge of hydraulic fluid to and from the fluid cylinders is interrupted with the chassis height fixed to the present height. When the third measure mode is taken, the fluid in the fluid cylinders being discharged and the chassis height being lowered. Further, when it has been determined that the failure is of the B-type, the controller 20 subdivides the failure into B-1-type and B-2-type according to whether the measures for the failure have to be continued until the failure is removed or may be interrupted when the ignition switch of the vehicle is turned off. In the case of a B-1-type failure, the measure mode is continued until the failure is removed, and in the case of a B-2-type failure, the measures for the failure is interrupted when the ignition switch of the vehicle is turned off.

When it is determined that the failure is of the C-type, the controller 20 lights the warning lamp W, opens the fail-safe valve 41, and wide opens both the flow control valves 35 and 37. (steps S6 to S8) A predetermined time after the opening of the flow control valves 35 and 37, the controller 20 closes both the flow control valves 35 and 37. (steps S9 and S10) The predetermined time substantially corresponds to the time by which the constriction 43 delays closure of the check valve 38, and may be about one second, for instance. Thereafter, the controller 20 sets the flag F to "1" and returns. (step S11)

When it is determined in step S5 that the failure is not of the C-type, the controller 20 determines in step S12 whether the failure is of B-1-type. When it is determined in step S12 that the failure is of B-1-type, the controller 20 lights the warning lamp W, closes both the flow control valves 35 and 37, and opens the fail-safe valve 41. (steps S13 to S14) Thereafter, the controller 20 sets the flag F to "1" and returns. (step S16) Otherwise, the controller 20 determines in step S17 whether the failure is of B-2-type. When it is determined in step S17 that the failure is of B-1-type, the controller 20 lights the warning lamp W, closes both the flow control valves 35 and 37, and opens the fail-safe valve 41. (steps S18 to S20) Therafter, the controller 20 sets the flag F to "1" and returns. (step S21)

When it is determined in step S17 that the failure is not of B-2-type, the controller 20 determines in step S22 whether the failure is of the A-type. When it is determined that the failure is of the A-type, the controller 20 lights the warning lamp W in step S23, and returns after setting the flag F to "1" in step S24. When it is determined in step S22 that the failure is not of the A-type, that is, when the failure is not of the A-type, the B-type or the C-type, the controller 20 returns after interrupting the control in step S25.

When it is determined in step S1 that the flag F is "1", the controller 20 determines whether the failure is of the B-1-type or the C-type. When it is determined that the failure is of the B-1-type or the C-type, the controller 20 immediately returns. Otherwise, the controller 20 determines in step S27 whether the ignition switch is off. When it is determined that the ignition switch is off, the controller 20 returns after setting the flag F to "0" in step S28. Otherwise, the controller 20 returns immediately.

For example, the following phenomena indicate occurrence of a failure which belongs to the A-type failure.

1. When the chassis height is lower than the reference value by 30 mm or more when the ignition switch is turned on (the fail-safe valve 41 is closed at that time). This can be caused when the check valve 38 is clogged by dust, which can be removed when the pressurized oil flows through the liquid pressure passage 10.

2. When the vehicle speeds which are calculated on the basis of the outputs of the respective vehicle speed sensors 18 differ from each other by a predetermined value. Though the vehicle speed is used in the fluid cylinder control system which improves the response of the fluid cylinders 3 during cornering, the vehicle is not so important in the control and accordingly the flow control itself need not be stopped.

The following phenomena indicates occurrence of a failure which belongs to the B-1-type failure 1. When the main pressure is below the reference pressure (30kgf/cm$^2$) when several seconds have elapsed after the ignition switch is turned on. This can be caused when the fail-safe valve 41 gets trapped in the closed position, when the liquid pressure passage is broken or the main pressure sensor 12 fails. These failures are serious and can be never removed without service.

2. When the output signal of the main pressure sensor 12 is at a voltage higher than the upper limit voltage (e.g., 4.5v). This can be caused by a Vcc short circuit in the main pressure sensor 12.

3. When the main pressure is higher than 185kgf/cm$^2$. This can be caused when the unload valve 27 fails. When the main pressure falls below 100kgf/cm$^2$, the controller 20 temporarily interrupts the control until it rises above 110kgf/cm$^2$ (step S25 in FIG. 3)

4. When the main pressure does not rise for a predetermined time (e.g., five seconds) while the main pressure is below 100kgf/cm$^2$ and the control is being interrupted. This can be caused when the unload valve 27, the main pressure sensor 12 or the like fails.

5. When the state that the change with time of the main pressure P is represented by formula $|P(t)-P(t\Delta t)|$ 2kgf/cm$^2$ wherein $\Delta t$ is 1 second continues for 10 minutes. This can be caused when the signal of the main pressure sensor 12 is fixed.

6. When the electric line to the sensors 12 to 19 or the actuators for the hydraulic pump 8 or the like is cut.

7. When the output signal of the oil level sensor (not shown) which detects the amount of oil in the reservoir 29 continues to be off for more than 1 second. This can be caused when the oil line is broken.

8. When the output signal of the cylinder pressure sensor 13 is at a voltage higher than the upper limit voltage (e.g., 4.5v). This can be caused by a Vcc short circuit in the cylinder pressure sensor 13.

9. When the output signal of the cylinder pressure sensor 13 is at a voltage lower than the lower limit voltage (e.g., 0.5v). This can be caused by a GND short circuit in the cylinder pressure sensor 13.

10. When the output signal of the chassis height sensors 14 is at a voltage higher than the upper limit voltage (e.g., 4.5v). This can be caused by a Vcc short circuit in the chassis height sensors 14.

11. When the output signal of the chassis height sensors 14 is at a voltage lower than the lower limit voltage (e.g., 0.5v). This can be caused by a GND short circuit in the chassis height sensors 14.

12. When the output signal of the vertical acceleration sensors 15 is at a voltage higher than the upper limit voltage (e.g., 4.5v) for one second or more. This can be caused by a Vcc short circuit in the vertical acceleration sensors 15.

13. When the output signal of the vertical acceleration sensors 15 is at a voltage lower than the lower limit voltage (e.g., 0.5v) for one second or more. This can be caused by a GND short circuit in the vertical acceleration sensors 15.

14. When the output signal of the lateral acceleration sensor 16 is at a voltage higher than the upper limit voltage (e.g., 4.5v) for one second or more. This can be caused by a Vcc short circuit in the lateral acceleration sensor 16.

15. When the output signal of the lateral acceleration sensor 16 is at a voltage lower than the lower limit voltage (e.g., 0.5v) for one second or more. This can be caused by a GND short circuit in the lateral acceleration sensor 16.

14. When the output signal of the steering angle sensor 17 is at a voltage higher than the upper limit voltage (e.g., 4.5v) for one second or more. This can be caused by a Vcc short circuit in the steering angle sensor 17.

15. When the output signal of the steering sensor 17 is at a voltage lower than the lower limit voltage (e.g., 0.5v) for one second or more. This can be caused by a GND short circuit in the steering angle sensor 17.

16. CPU error

The following phenomena indicate occurrence of a failure which belongs to the B-2-type failure.

1. When the output signal of the main pressure sensor 12 is at a voltage lower than the lower limit voltage (e.g., 0.5v). This can be caused by a GND short circuit in the steering angle sensor 17, and can be sometimes removed without service.

2. When the state that the change with time of the main pressure P is represented by formula $|P(t)-P(t-\Delta t)| \leq 2$kgf/cm$^2$ wherein $\Delta t$ is 1 second continues for at least 5 seconds after the vertical acceleration G(t) and the acceleration of gravity G have come to satisfy formula $G(t)-1G<-0.1G$. This can be caused when the signal of the main pressure sensor 12 is fixed but can be sometimes removed without service since duration is short 3. When the state that the change with time of the main pressure P is represented by formula $|P(t)-P(t\Delta t)| \leq 2$kgf/cm$^2$ wherein $\Delta t$ is 1 second continues for at least 5 seconds while the present chassis height H(t) and the reference chassis height Ho satisfy formula H(t)-Ho when the wheels bump. This can be caused when the signal of the cylinder pressure sensor 13 is fixed but can be sometimes removed without service since duration is short 4. When the main pressure falls below 90kgf/cm$^2$. This can be caused when the oil line is broken.

5. When the vertical acceleration at a certain wheel becomes not higher than a predetermined value (0.1G) and the output of the chassis height sensor 14 does not change for 3 seconds. This can be caused when the signal of the chassis height sensor 14 is fixed and can be sometimes removed without service.

6. When the state that the output of a certain vertical acceleration sensor at a certain time is equal to that 100 ms before while the outputs of other two or the other three vertical acceleration sensors at the time are equal to those 100 ms before continues for 500 ms. This can be caused when the signal of the vertical acceleration sensor 15 is fixed and can be sometimes removed without service.

7. When the output of a certain chassis height sensor 14 does not approximate to the reference value for ten minutes while the vehicle runs. This can be caused when the signal of the chassis height sensor 14 is fixed and can be sometimes removed without service.

The following phenomenon indicates occurrence of a failure which belongs to the B-2-type failure.

When the stroke position of the flow control valve 35 and/or the flow control valve 7 for each wheel deviates from the target position commanded by the command signal and this state continues for a predetermined time. This can be caused when the flow control valve 9 gets jammed. In this case, the chassis heights at the respective wheels cannot be equalized but to discharge the hydraulic oil in all the fluid cylinders 3.

When the sum of the cylinder pressure and $10 kgf/cm^2$ becomes higher than the line pressure, the control is interrupted in order to prevent reverse flow of the hydraulic oil.

Though the present invention is applied to the suspension system having both the fluid cylinders and the gas springs in the embodiment described above, the present invention can be applied to the suspension system which is not provided with gas springs.

We claim:

1. A vehicle suspension system comprising fluid cylinders connected between the vehicle body and the respective wheels; a fluid control system which controls feed and discharge of hydraulic fluid to and from the fluid cylinders and changes the suspension properties of the suspension system; a failure detecting means which detects a failure in the fluid control system; a measure mode determining means which receives a signal from the failure detecting means and determines which of first to third measure modes is to be taken on the basis of the kind of the failure represented by the signal, warning being just given and the control of feed and discharge of hydraulic fluid to and from the fluid cylinders being continued when the first measure mode is taken, the control of feed and discharge of hydraulic fluid to and from the fluid cylinders being interrupted with the chassis height fixed to the present height when the second measure mode is taken, and the fluid in the fluid cylinders being discharged and the chassis height being lowered when the third measure mode is taken; and a performance means which receives a signal from the measure mode determining means and performs the measure mode determined by the measure mode determining means.

2. A vehicle suspension system as defined in claim 1 in which said fluid control system comprises an accumulator which accumulates the hydraulic oil in order to increase the hydraulic pressure to a predetermined value, flow control valves which are provided in the hydraulic passages to the respective fluid cylinders and controls flow of the hydraulic fluid through the hydraulic passages, a check valve which is provided in the hydraulic passage to each fluid cylinder between the fluid cylinder and the flow control valve, a relief valve which drains the hydraulic fluid in the accumulator, and a delay means which causes the check valve to close a predetermined time after opening of the relief valve.

3. A vehicle suspension system as defined in claim 2 in which said check valve is closed under the hydraulic pressure applied thereto from the accumulator through a pilot pressure passage and said delay means comprises a constriction provided in the pilot pressure passage.

4. A vehicle suspension system as defined in claim 1 in which said measure mode performing means outputs a signal which causes the flow control valves to close and a signal which causes the check valves to open when the second measure mode is to be taken.

5. A vehicle suspension system as defined in claim 1 in which said measure mode performing means outputs a signal which causes the check valves to open and a signal which causes the flow control valves to open at least for predetermined time when the third measure mode is to be taken.

6. A vehicle suspension system as defined in claim 1 in which at least one gas spring is connected to each of said fluid cylinders.

7. A vehicle suspension system comprising fluid cylinders connected between the vehicle body and the respective wheels; a fluid control system which controls feed and discharge of hydraulic fluid to and from the fluid cylinders and changes the suspension properties of the suspension system; a failure detecting means which detects a failure in the fluid control system; a measure mode determining means which receives a signal from the failure detecting means and determines which of first to third measure modes is to be taken on the basis of the kind of the failure represented by the signal, warning being just given and the control of feed and discharge of hydraulic fluid to and from the fluid cylinders being continued when the first measure mode is taken, the control of feed and discharge of hydraulic fluid to and from the fluid cylinders being interrupted with the chassis height fixed to the present height when the second measure mode is taken, and the fluid in the fluid cylinders being discharged and the chassis height being lowered when the third measure mode is taken; a measure mode duration determining means which determines whether the determination of the measure mode determining means is to be canceled when the ignition switch of the vehicle is turned off or to be held until the failure is removed; and a measure mode performing means which receives a signal from the measure mode determining means and the measure mode duration determining means and performs the measure mode determined by the measure mode determining means.

8. A vehicle suspension system as defined in claim 7 in which, when the failure is of the kind for which the first measure mode is to be taken, the determination of the measure mode determining means is canceled when the ignition switch of the vehicle is turned off, and when the failure is of the kind for which the third measure mode is to be taken, the determination of the measure mode determining means is held until the failure is removed.

* * * * *